United States Patent [19]

Wideman et al.

[11] Patent Number: 4,946,879

[45] Date of Patent: Aug. 7, 1990

[54] REACTION PRODUCT OF A ROSIN ACID AND AN ANTIDEGRADANT

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 231,030

[22] Filed: Aug. 11, 1988

Related U.S. Application Data

[62] Division of Ser. No. 21,095, Mar. 3, 1987, Pat. No. 4,775,496.

[51] Int. Cl.$^5$ ............................................. C08C 1/06
[52] U.S. Cl. ........................................ 524/93; 524/187; 524/255; 524/270; 524/274; 530/215; 530/218
[58] Field of Search .................. 524/93, 187, 255, 270, 524/274; 530/215, 218

[56] References Cited

U.S. PATENT DOCUMENTS

| | | | |
|---|---|---|---|
| 2,656,343 | 10/1953 | Ritchie | 260/103 |
| 2,736,664 | 2/1956 | Bradley et al. | 260/104 |
| 3,567,487 | 3/1971 | Poppe et al. | 524/274 |
| 4,131,709 | 12/1978 | Schunck et al. | 524/274 |
| 4,373,041 | 2/1983 | Wood et al. | 524/270 |
| 4,478,993 | 10/1984 | Wideman et al. | 524/274 |
| 4,639,492 | 1/1987 | Makhloaf et al. | 260/103 |

FOREIGN PATENT DOCUMENTS

19166 9/1967 Japan ............................................. 524/93

OTHER PUBLICATIONS

CA 80:49487e (for Orizarski), God. Nanckroizsled, Inst. Khim. Prom., 1970.
CA 68:106220r (for McBride), Arizona Chemical Co. (1968).
CA 80:4198v (for Shpenzer), Tr. Leningrad. Tekhnol. Inst. Tullyal-Bum. Prom., 1972.
CA 72:44389z (for Lattewirz) Reichhold-Albert-Nachr, 1968.

*Primary Examiner*—John Kight, III
*Assistant Examiner*—Dennis R. Daley
*Attorney, Agent, or Firm*—Marc R. Dion, Sr.

[57] ABSTRACT

There is disclosed a reaction product of a rosin acid and a polyfunctional compound having at least one functional group capable of reacting with a carboxylic acid functionality and another functional group having antidegradant properties.

The reaction products of this invention can be used as antidegradants in polymeric compositions and lubricating oil compositions.

6 Claims, No Drawings

REACTION PRODUCT OF A ROSIN ACID AND AN ANTIDEGRADANT

This is a divisional of application Ser. No. 021,095, filed on Mar. 3, 1987, now U.S. Pat. No. 4,775,496.

TECHNICAL FIELD

This invention relates to antidegradants. More particularly, it relates to antidegradants which are relatively unextractable from the rubber compounds in which they are incorporated and to the rubber compounds containing them.

BACKGROUND ART

Essentially all types of rubber, both natural and synthetic, and particularly rubbers formed from dienes are known to be susceptible to deterioration resulting from prolonged exposure to oxygen, ozone, light and heat. A great deal of effort has been expended by those engaged in the field of polymer technology to develop various antidegradants that will effectively inhibit the adverse effects of aging of polymeric compositions. In addition, much work has been done to discover new ways to prevent antidegradants from leaving polymer compositions by extraction, migration or volatilization. One particular area of concern deals with the antidegradants used in the tire industry where improvements in the polymers or polymer blends have increased the serviceable life of the tires thus prolonging the exposure to the degradative effects mentioned above.

One approach taken to overcome the problems of extraction and volatilization has been to use compounds of higher molecular weight such as has been disclosed in U.S. Pat. Nos. 3,975,414 and 4,152,319. Another approach has been to use an antidegradative monomer which polymerizes to become part of the polymer as has been disclosed in U.S. Pat. Nos. 3,658,769 and 3,817,916. Still another approach has been to graft a reactive antidegradant onto an existing polymer chain as disclosed in U.S. Pat. No. 4,155,955.

DISCLOSURE OF THE INVENTION

In accordance with the practice of the present invention, there is disclosed a reaction product of:
(a) a rosin acid and
(b) a polyfunctional compound having at least one functional group capable of reacting with a carboxylic acid functionality and another functional group having antidegradant properties.

There is also disclosed a rubber compound comprising a polymer susceptible to the degradative effects of oxidation and/or ozonation having incorporated therein the reaction product from above. Additionally, there is disclosed a lubricating oil composition comprising a lubricating oil and an antidegradant effective amount of a reaction product of the present invention.

The rosin acids which can be used in the practice of the present invention are monocarboxylic acids having the typical molecular formula $C_{20}H_{30}O_2$. Rosin acids are derived from rosin which is a solid resinous material that occurs naturally in pine trees. There are three major sources of rosin, (1) gum rosin from the oleoresin extrudate of the living tree, (2) wood rosin from the oleoresin contained in the aged stumps, and (3) tall oil rosin from the waste liquor recovered as a by-product in the Kraft paper industry. Rosins derived from both oleoresin and aged stump wood are composed of approximately 90 percent rosin acids and 10 percent non-acidic components.

Two of the major rosin acid components are: abietic acid, having the structural formula

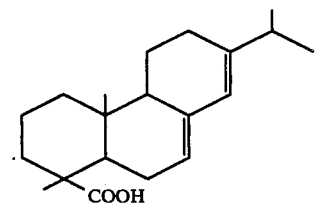

I and dehydroabietic acid, having the structural formula

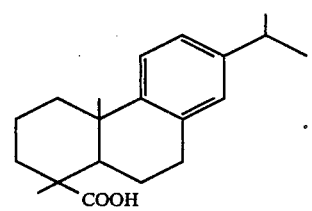

II

The reaction products of the present invention using the two major components illustrated above as Structures I and II are represented by the following structural formulae:

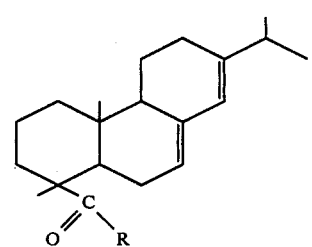

III and

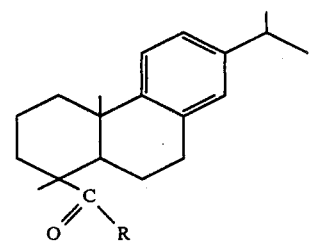

IV wherein R is a radical having an antidegradant functionality.

Representative of the other rosin acid components which can be used in the practice of this invention are levopimaric, neoabietic, palustric, tetrahydroabietic, pimaric, isopimaric, elliotinoic and Sandaracopimaric.

The polyfunctional compounds which can be used in the practice of this invention are those having one or more antidegradant functionalities and at least one functionality which can react with the carboxylic acid functionality of the rosin acid such as by esterification or amidation reactions but not limited thereto. Representative of, but not limited to, the polyfunctional compounds are:
hydroquinone, either substituted or unsubstituted,
monophenolics having a hydroxy alkyl group, such as 4-hydroxymethyl-2, 6-di-t-butyl phenol:
bisphenols, such as 4,4'-methylenebis-(2,6-di-t-butyl phenol) or 4,4'-butylidenebis-(6-t-butyl-3-methyl phenol);
thiobisphenols, such as 4,4'-thiobis-(6-t-butyl-m-cresol) or 4,4'-thiobis(6-t-butyl-o-cresol);
mercaptans, such as 2-mercaptobenzimidazole: and amine types, such as
p-amino-diphenylamine;
p-hydroxy-diphenylamine;
p-hydroxy-p'-amino-diphenylamine and
p,p'-diamino-diphenylamine;
Representative of the radicals which can be represented by R in Structures III and IV are as follows:

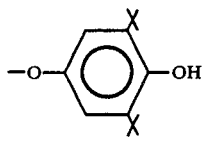

V

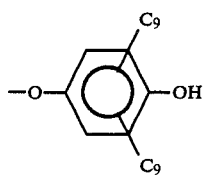

VI

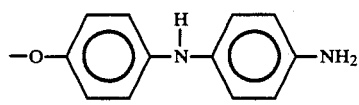

VII

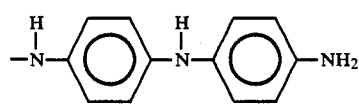

VIII

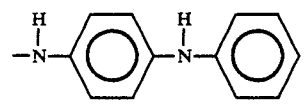

IX

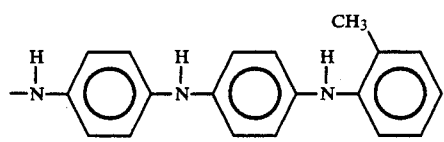

X and

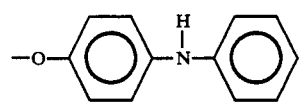

XI

Any method can be used to ma reaction product of the instant invention which can attach the carboxylic acid reactive functionality of the polyfunctional compound to the carboxylic acid functionality of the rosin acid. Typically, but not limited thereto, the rosin acid and the polyfunctional compound can be reacted to form the adduct by such reactions as esterification and amidation, accompanied by water removal, using known catalysts such as sulfuric acid, hydrochloric acid and toluenesulfonic acid, for example. The reaction temperatures used can be from 100° C. to 250° C. An organic solvent can be used to increase heat transfer, and to facilitate the water removal through a reflux trap. Recovery of the reaction product is accomplished by neutralization of the catalyst, filtration to remove neutral catalyst salts and drying or vacuum drying to remove the solvent and unreacted low boiling materials.

Representative of the rubbery polymers which can benefit from the reaction product of the present invention include but are not limited to, natural polyisoprene, synthetic polyisoprene, polybutadiene, styrene-butadiene copolymers, acrylonitrile-butadiene copolymers, polychloroprene, ethylene-propylene polymers, polymers of ethylene-propylene-diene monomer, butyl rubber, halobutyl rubber, or any combinations thereof. In addition, the compounds can contain other compounding ingredients such as carbon black, processing aids, curatives, accelerators, fillers, extending oils and other antidegradants. Of particular benefit would be the use of the reaction product in a rubber compound containing an extending oil wherein the extending oil is a decarboxylated rosin acid, also known as a thermal oil. These types of thermal oils have been disclosed in U.S. Pat. No. 4,478,993 and have been shown to be relatively unextractable after air aging. U.S. Pat. No. 4,478,993 is hereby incorporated by reference. It is expected that the same mechanisms which renders the "thermal oils" relatively unextractable would also render the reaction product of the present invention relatively unextractable or slower migrating than antidegradants alone, thus providing longer term persistence.

The method used to incorporate the reaction product into the polymer is not critical. The reaction product can be incorporated into the polymers directly as are conventional extending oils, either "thermal oil" or petroleum based, or can be added as an admixture with the extending oils. The reaction product can also be incorporated into rubber compounds by known methods such as Banbury mixing or mill mixing.

The level at which the reaction products are used is 0.5 to 10 parts, preferably 1 to 8 parts, most preferably 2 to 6 parts, all by weight, per 100 parts by weight of rubbery polymer.

In addition to the use of the reaction products of the present invention in rubber compounds, they can also be used as antidegradants in lubricating oils. It is expected that the benefit derived from the use of the reaction products of the present invention in lubricating oils would accrue due to their higher molecular weights than conventionally used antidegradants and to their compatibility with the oils. The higher molecular weights would contribute to lower volatility thus lower weight loss when the oils are at high temperatures. The compatibility with the oils would be advantageous from the standpoint of a greater range of solubility thus lessening the possibility of the antidegradant plating out on the equipment being lubricated due to low solubility at varying operating conditions.

The levels at which the reaction products can be used in lubricating oils are 0.5 to 10 parts, preferably 1 to 8 parts, most preferably 2 to 6 parts, all by weight, per 100 parts of the lubricating oil.

The following examples are intended to illustrate, but not to limit, the present invention:

EXAMPLE 1

One-half mole, 149 g of dehydroabietic acid with an acid number of 158 and 92 g of p-aminodiphenylamine were added to 11 g of toluenesulfonic acid in 130 ml of m-xylene. The mixture was added to a 3-neck, 1-liter flask equipped with a Dean-Stark trap and a pot thermometer. After 40 hours at a pot temperature of 245° C. with reflux, 85 to 90% of the theoretical amount of water was removed. Gel permeation chromatographic analysis showed the coupled product. The thick black material was dissolved in 400 ml of toluene and washed with 11 g of sodium carbonate in about 500 ml of water. The reaction product: a black semi-solid, was dried in a vacuum oven at 100° C. for 16 hours. The reaction product had an acid number of 7.

EXAMPLE 2

One-half mole, 149 g, of dehydroabietic acid and 93 g of p-hydroxydiphenylamine were added to 11 g of toluenesulfonic acid in 100 ml of m-xylene using the equipment of Example 1. After 24 hours of reflux at a pot temperature of 205° C., 97% of the theoretical amount of water was removed. The dark semi-solid product was recovered as described in Example 1. The reaction product gave an acid number of 8.

EXAMPLE 3

One gram of the reaction product from Example 1 was diluted to 100 mL with toluene. A 2 mL portion of the resulting solution were mixed with a toluene solution containing 1 g of an unstabilized copolymer of styrene and butadiene (SBR). The toluene was evaporated by air drying to leave a rubber containing 2 parts by weight of the reaction product per 100 parts by weight of rubber (phr).

The same procedure was repeated for the reaction product of Example 2. These two rubbers were compared to a control sample of the same SBR in an oxygen absorption test according to the procedure described in Industrial and Engineering Chemistry, Vol. 43, p. 456 (1951) and Industrial and Engineering Chemistry, Vol. 45, p. 392 (1953). Results are shown in Table I. Numbers reflect the hours required for the samples to absorb 1% $O_2$ at 100° C.

TABLE I

| Sample | Hours |
| --- | --- |
| Control, no antidegradant | 20 |
| Rubber with 1 reaction product | 648 |
| Rubber with 2 reaction product | 408 |

The data are indicative of the antioxidant protection afforded by the reaction products of the present invention.

EXAMPLE 4

In order to determine the relative volatilities of the reaction products of the present invention as a measure of their staying power in those applications which operate at higher temperatures, e.g. in lubricating oils, the para-hydroxydiphenylamine reaction product of rosin acid from Example 2, and the para-aminodiphenylamine reaction product of rosin acid, from Example 1, were subjected to thermogravimetric analysis TGA along with a commercially available antidegradant, Wingstay TM 300, N-phenyl-N'-(1,3- dimethylbutyl)-p-phenylenediamine. Weighed samples were placed in a DuPontm TM 1090 Thermogravimetric analyzer and the computer monitoring weight percent was set to 100%. Next, the temperature was increased from room temperature to 240° C. while the computer plotted the residual weight as a percentage of the original sample weight. The results of TGA at 240° C. are shown in Table II.

TABLE II

| Sample | Residual Weight % |
| --- | --- |
| Example 1 Reaction Product | 81 |
| Example 2 Reaction Product | 79 |
| Wingstay TM [1] 300 | 49 |

Note[1]: Trademark of The Goodyear Tire & Rubber Company.

While certain representative embodiments and details have been shown for the purpose of illustrating the invention, it will be apparent to those skilled in this art that various changes and modifications may be made therein without departing from the scope of the invention.

What is claimed is:

1. A rubber composition comprising a polymer susceptible to the degradative effects of oxidation and/or ozonization having incorporated therein an effective amount of a reaction product of
   (a) a rosin acid and
   (b) a polyfunctional compound having at least one functional group capable of reacting with a carboxylic acid functionality and another functional group having antidegradant properties selected from the group consisting of
   substituted or unsubstituted hydroquinone,
   4-hydroxymethyl-2,6-di-t-butyl phenol,
   4,4'-methylenebis-(2,6-di-t-butyl phenol),
   4,4'-butylidenebis-(6-t-butyl-3-methyl phenol),
   4,4'-thiobis-(6-t-butyl-m-cresol),
   4,4'-thiobis(6-t-butyl-o-cresol),
   2-mercaptobenzimidazole,
   p-amino-diphenylamine,
   p-hydroxy-diphenylamine,
   p-hydroxy-p'-amino-diphenylamine, and
   p,p'-diamino-diphenylamine.

2. The rubber composition of claim 1 wherein the reaction product is present at a level from about 0.5 part to about 10 parts by weight per 100 parts by weight of polymer.

3. The rubber composition of claim 2 wherein the reaction product is present at a level from about 1 part to about 8 parts.

4. The rubber composition of claim 3 wherein the reaction product is present at a level from about 2 parts to about 6 parts.

5. A rubber composition comprising a polymer susceptible to the degradative effects of oxidation and/or ozonation having incorporated therein an effective amount of a compound having the following structural formula:

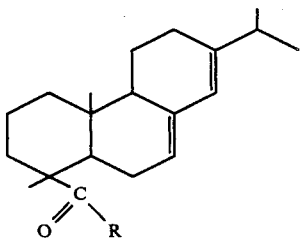
wherein R is a radical having an antidegradant functionality.
6. A rubber composition comprising a polymer susceptible to the degradative effects of oxidation and/or ozonation having incorporated therein an effective amount of a compound having the formula structural formula:
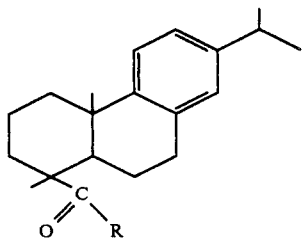
wherein R is a radical having an antidegradant functionality.
* * * * *